United States Patent
Basra (10) Patent No.: US 9,326,296 B2
(45) Date of Patent: Apr. 26, 2016

(54) METHOD AND APPARATUS FOR SCHEDULING DELIVERY OF CONTENT ACCORDING TO QUALITY OF SERVICE PARAMETERS

(71) Applicant: Cellco Partnership, Basking Ridge, NJ (US)

(72) Inventor: Arvind K. Basra, Glen Ridge, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 123 days.

(21) Appl. No.: 14/246,881

(22) Filed: Apr. 7, 2014

(65) Prior Publication Data

US 2015/0289231 A1  Oct. 8, 2015

(51) Int. Cl.
*H04W 72/12* (2009.01)
*H04W 72/00* (2009.01)
*G06F 15/16* (2006.01)
*H04W 4/06* (2009.01)

(52) U.S. Cl.
CPC ........ *H04W 72/1242* (2013.01); *H04W 72/005* (2013.01); *G06F 15/16* (2013.01); *H04W 4/06* (2013.01); *H04W 72/1284* (2013.01)

(58) Field of Classification Search
None
See application file for complete search history.

(56) References Cited

U.S. PATENT DOCUMENTS

| | | | | |
|---|---|---|---|---|
| 6,940,814 B1 * | 9/2005 | Hoffman | ............. | H04L 12/5693 370/235 |
| 8,429,539 B1 * | 4/2013 | Callies | .................. | G06F 3/0484 715/745 |
| 2004/0221053 A1 * | 11/2004 | Codella | .................... | H04L 47/10 709/231 |
| 2005/0245243 A1 * | 11/2005 | Zuniga | ............. | H04N 21/26208 455/414.3 |
| 2006/0247983 A1 * | 11/2006 | Dalli | ........................ | G06F 17/27 705/26.1 |
| 2012/0047201 A1 * | 2/2012 | Jain | .................. | H04N 21/26225 709/203 |
| 2015/0012661 A1 * | 1/2015 | Elmore | ............... | H04L 65/4084 709/231 |

* cited by examiner

Primary Examiner — Kodzovi Acolatse (57) ABSTRACT

An approach for scheduling and delivery of contents from one or more sources to one or more service areas according to one or more QoS parameters. The approach includes receiving a request to schedule a content package for delivery to a service area over a multicast data channel, wherein the multicast data channel is associated with a default scheme for scheduling the delivery. The approach also includes identifying a prioritization parameter associated with the content package, a provider of the content package, or a combination thereof. Additionally, the approach includes determining whether to initiate an override of the default scheme for the delivery of the content package based on the prioritization parameter. Further, the approach includes scheduling the content package based on the override, the default scheme, or a combination thereof.

20 Claims, 8 Drawing Sheets

METHOD AND APPARATUS FOR SCHEDULING DELIVERY OF CONTENT ACCORDING TO QUALITY OF SERVICE PARAMETERS

BACKGROUND INFORMATION

In a cellular network, evolved multimedia broadcast multicast service (eMBMS) is a point-to-multipoint service in which data/content is transmitted from a single source entity to multiple recipients (e.g., user devices), where transmitting the same content to multiple recipients allows sharing of the network resources. Additionally, eMBMS provides for a high quality of service (QoS) delivery platform capable of guaranteed bitrate (GBR) service and scheduled content delivery with success reporting. However, with an increase in the amount of available online content, content requests from users, and content providers, it can be challenging for a service provider/network operator to assure an accurate or prioritized delivery of the contents to users in various service areas of the network. In one scenario, a service provider may identify a plurality of content items that are to be delivered to users in its service areas, but with contents available from a variety of content providers/sources, the service provider would need an efficient mechanism for prioritizing the delivery of the contents to the users. Further, some of the contents may need to be delivered within certain delivery accuracy parameters.

Based on the foregoing, there is a need for a mechanism for scheduling and delivery of contents from one or more sources to one or more service areas according to one or more QoS parameters.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for scheduling and delivery of contents from one or more sources to one or more service areas according to one or more QoS parameters are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described for scheduling and delivery of contents from one or more sources to one or more service areas according to one or more QoS parameters, it is contemplated that these embodiments have applicability to a variety of processes and methods for identifying, scheduling, and provisioning data channels and delivery of contents according to one or more QoS parameters to users in one or more service areas.

Figure 1:
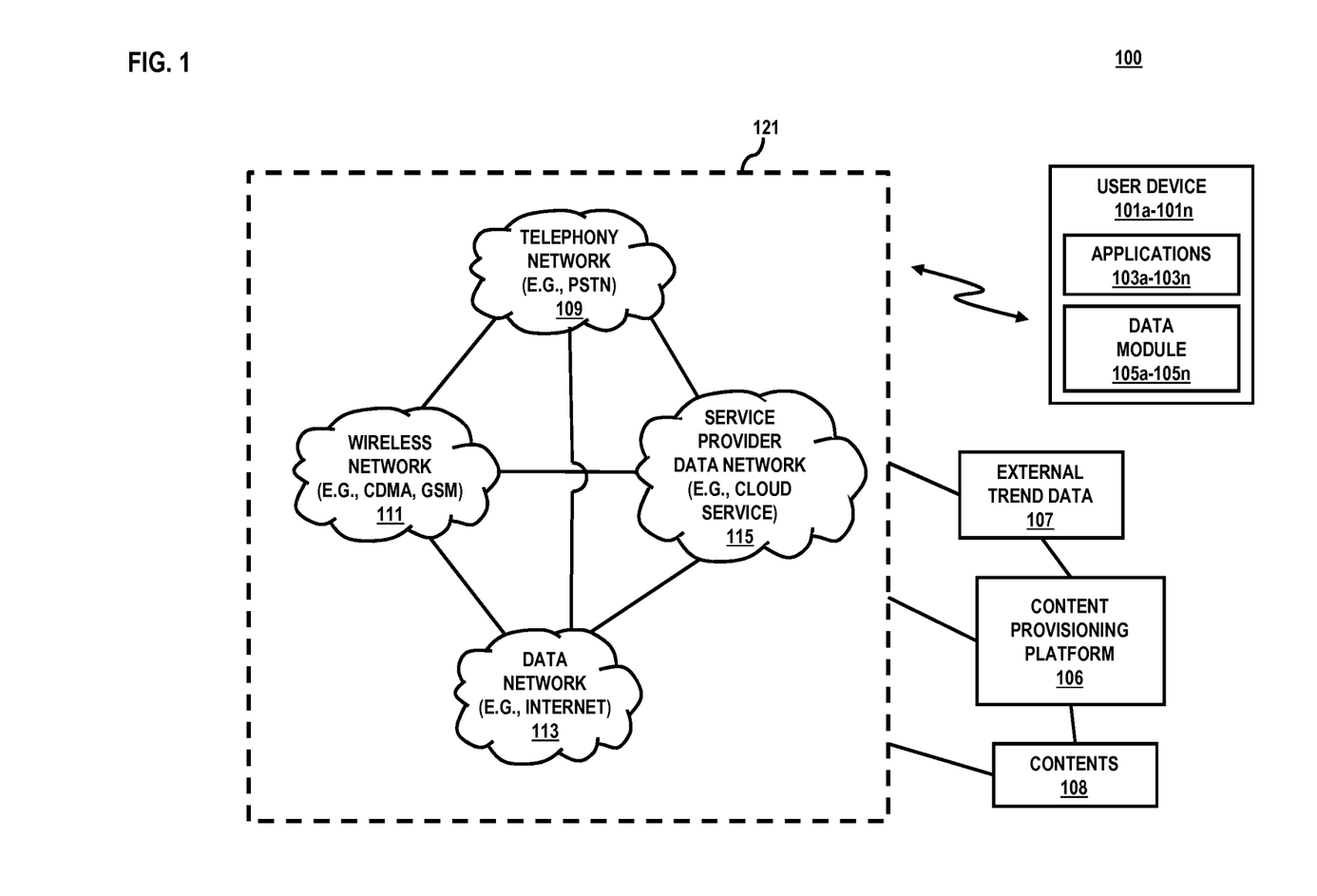
FIG. 1 is a diagram of a system capable of scheduling and delivery of contents from one or more sources to one or more service areas according to one or more QoS parameters, according to one embodiment.

FIG. 1 is a diagram of a system for a mechanism for scheduling and delivery of contents from one or more sources to one or more service areas according to one or more QoS parameters. In a current design of eMBMS, an operator may identify certain contents for delivery to users in a service area; for example, the operator can manually track content popularity and consumption by users in one or more service areas and then identify additional contents that may be of interest to the users. However, potential inaccuracies and a slow response in determining or predicting content consumption, e.g., based on an event, topic, content consumption data, etc., and a delay in scheduling the content for transmission may cause less than optimum network performance, user experience, and ultimately, loss of revenue for the network operator. For example, a service provider may identify a plurality of content items that may suitable for delivery to users in a service area; however, it can be challenging as to how prioritize the content items and what QoS parameters to use for the delivery of the content items. In one scenario, a typical scheduling scheme may be to deliver the content items according to first-come-first-served basis or according to some default parameters determined by the service provider or providers of the content items (content providers). Additionally, a content provider could provide various incentives to a service provider for delivering its content to the users based on a different priority, accuracy of the delivery, or the like. For example, the content provider may agree with the service provider to pay additional fees for prioritizing the delivery of its content before the delivery of other contents available from other content providers. Therefore, there is a need a mechanism for scheduling and delivery of contents from one or more sources to one or more service areas according to one or more QoS parameters.

To address these issues, system 100 of FIG. 1 provides the capability for provisioning of one or more dynamic multicast data channels and delivery of contents from one or more sources according to one or more QoS parameters, according to one embodiment. In general, as part of the services offered by service providers, e.g., communication network service providers, a service provider can provision one or more communication data channels for delivering various contents (e.g., digital multimedia files) to users in a service area associated with the service provider. Further, in some situations, a service provider may monitor content popularity and consumption over one or more network channels servicing one or more service areas, for instance, providing wireless communications and content delivery. For example, a service provider may utilize analytics of its network to determine content consumption via one or more channels or cells associated with a given service area. In one scenario, the service provider may utilize social networking data that can indicate trending data associated with certain contents, a geographical area, an event, a personality, or the like, wherein the trending data may be used as is or may be further analyzed to determine or predict user demand for similar or additional contents. The analytics may use one or more data mining techniques to process and analyze network data, which may be determined from data (e.g., non-voice, SMS, MMS, content request, content consumption, application downloads, etc.) transacted by users of the service provider's network. Further, the data may be processed and analyzed from many different dimensions or perspectives for categorizing, identifying, summarizing possible relationships, or ascertaining different data or content usage patterns. For example, the data may indicate patterns of content consumption, shopping patterns, users' habits, or the like. In various implementations, the analysis may be performed by various data mining or analysis algorithms, software, applications, or the like.

Additionally, the service provider may utilize social networking data that may indicate trending data associated with a content, geographical area, an event, a personality, or the like, wherein the trending data may be used as is or may be further analyzed to determine or predict user demand for similar or additional content. In one scenario, the trending data may be provided by an external service provider, which may use data from one or more social networking sources for compiling and providing the trending data to one or more other service providers.

In one embodiment, a service provider may utilize a context aware algorithm for determining additional contents that may be of interest to users associated with the trending data in a service area. Further, the service provider may use predictive knowledge of user behavior related to consumption of content on various user devices where prediction of content usage may allow a service provider to change the time and the location of content delivery and opportunistically utilize available resources in its network. Provision of such services can increase network utilization/efficiency as well as improve user perceived service quality.

Furthermore, once the service provider identifies contents that are being requested or consumed by users in a service area, it can then identify other contents that may be related, relevant, or may be deemed as being potentially of interest to those users. In one scenario, the service provider may identify the other contents based on information provided by one or more content or other service providers. For instance, a content provider may wish to provision contents to users in a service area of a service provider if the service provider determines consumption, requests, or trending data associated with certain contents in that service area. In one example, if a service provider determines that the trending data in a service area is associated with a certain musician, then information associated with a certain content provider may indicate that the content provider wishes to provide audio/video music samples by that musician to users in that service area.

In one scenario, a service provider may determine from trending data that certain contents, available from a plurality of content providers, are suitable for delivery to users in a certain service area. In one embodiment, the service provider may determine and present to the plurality of content providers one or more QoS options for the delivery of those contents to the users. In one embodiment, a QoS option may be for determining a time of delivery where a content provider may choose when its content is delivered. For example, a content provider may select an option to deliver a content package before delivering other contents from other content providers to the users. In one embodiment, a QoS option may be for determining a transmission accuracy rate (e.g., a transmission bit rate.) For example, if a content item is a streaming of a music video, then transmission/streaming of that content item may need to be at a certain minimum bitrate so that the content item is properly delivered to the user for an acceptable rendering at a user device and for a good user experience. In one scenario, contents identified for delivery to the users may be based on various parameters such as time of day, day of the week, weather conditions, holidays, or the like associated with a service area of the users.

For the purpose of illustration, the system 100 may include one or more user devices 101a-101n (user device 101), which may include, execute, and utilize one or more applications 103a-103n (also referred to as applications 103) and one or more data collection modules 105a-105n (also referred to as Data module 105).

Further, the system 100 may include a network system 121, which may include one or more networks, including a telephony network 109, a wireless network 111, a data network 113, a service provider data network 115, etc. By way of example, the networks 109, 111, 113, and 115 may be any suitable wireline and/or wireless network, which may be managed by one or more service providers. In one example, the networks 109, 111, 113, and 115 may be one or more elements in a network system 121, which may include various components and elements for providing a range of communication and network services. For example, telephony network 109 may include a circuit-switched network, such as the public switched telephone network (PSTN), an integrated services digital network (ISDN), a private branch exchange (PBX), or other like network. Wireless network 111 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Furthermore, the system 100 may include a content provisioning platform 106 (provisioning platform), which may be a standalone component or it may be implemented in one or more elements of the network system 121, for example, in the service provider data network 115. The provisioning platform may have access to external trend data 107, which may be provided by one or more service providers and/or content providers. In one scenario, the external trend data 107 may be determined by the service provider data network 115 and/or it may be provided by one or more external service providers, for example, by one or more online social networking service providers. In various embodiments, the external trend data 107 may be raw data, which can be processed by the provisioning platform and/or by one or more elements of the system 100 to determine content consumption trending data. In various scenarios, the external trend data 107 may include data associated with a plurality of service providers or it may be based on one or more subscription accounts associated with the provisioning platform and/or the service provider data network 115, wherein a social networking account may be utilized to follow and track various topics, content consumptions, events, or the like via one or more social networking service providers. Additionally, the provisioning platform may have access to various contents 108 (e.g., audio, video, images, text, etc.), which may be available as part of the network system 121 or may be provided by one or more content providers; for example, multimedia files, news updates, reports, or the like that may be available from their respective producers, owners, distributors, or the like.

Although depicted as separate entities, networks 109, 111, 113, and 115 may be completely or partially contained within one another, or may embody one or more of the aforementioned infrastructures. For instance, the service provider network 115 may embody circuit-switched and/or packet-switched networks that include facilities to provide for transport of circuit-switched and/or packet-based communications. It is further contemplated that networks 109, 111, 113, and 115 may include components and facilities to provide for signaling and/or bearer communications between the various components or facilities of system 100. In this manner, networks 109, 111, 113, and 115 may embody or include portions of a signaling system 7 (SS7) network, or other suitable infrastructure to support control and signaling functions.

By way of examples, the user devices 101 may communicate with other devices via one or more proximity-based communication channels or via one or more network service providers in the network system 121. Further, the applications 103 may include various applications for productivity, education, entertainment, social networking, web browser, communications, content sharing, multimedia applications, user interface (UI), map application, web client, or the like.

In one embodiment, a user device 101 may utilize a Data module 105 for determining/collecting data or content associated with the user device 101, one or more users of the user device 101, the applications 103, one or more content items (e.g., multimedia content), and the like. In addition, the user device 101 can execute an application 103 that is a software client for storing, processing, and/or forwarding one or more information items to other components of the system 100. In various embodiments, the Data module 105 may include various sensors for detecting and capturing various signals, information, and contents, for example, audio, video, location information, Bluetooth signals, near field communication (NFC) signals, wireless local area network (WLAN) signals, RFID signals, or the like. Further, the collected information, content, or signals may be shared, via the applications 103 with other user devices 101, the content provisioning platform 106, or with service providers in the network system 121.

It is noted that user devices 101 may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone, set-top box, TV set, or any combination thereof. It is also contemplated that the user devices 101 can support any type of interface for supporting the presentment or exchanging of data. In addition, user devices 101 may facilitate various input means for receiving and generating information, including touch screen capability, keyboard and keypad data entry, voice-based input mechanisms and the like. Any known and future implementations of user devices 101 are applicable. In certain embodiments, user devices 101 may be configured to establish peer-to-peer communication sessions with each other using a variety of technologies, including near field communication (NFC), Bluetooth, ZigBee, infrared, etc. Also, connectivity can be provided via a wireless local area network (LAN). By way of example, a group of user devices 101 may be configured to a common LAN so that each device can be uniquely identified via any suitable network addressing scheme.

Figure 2:
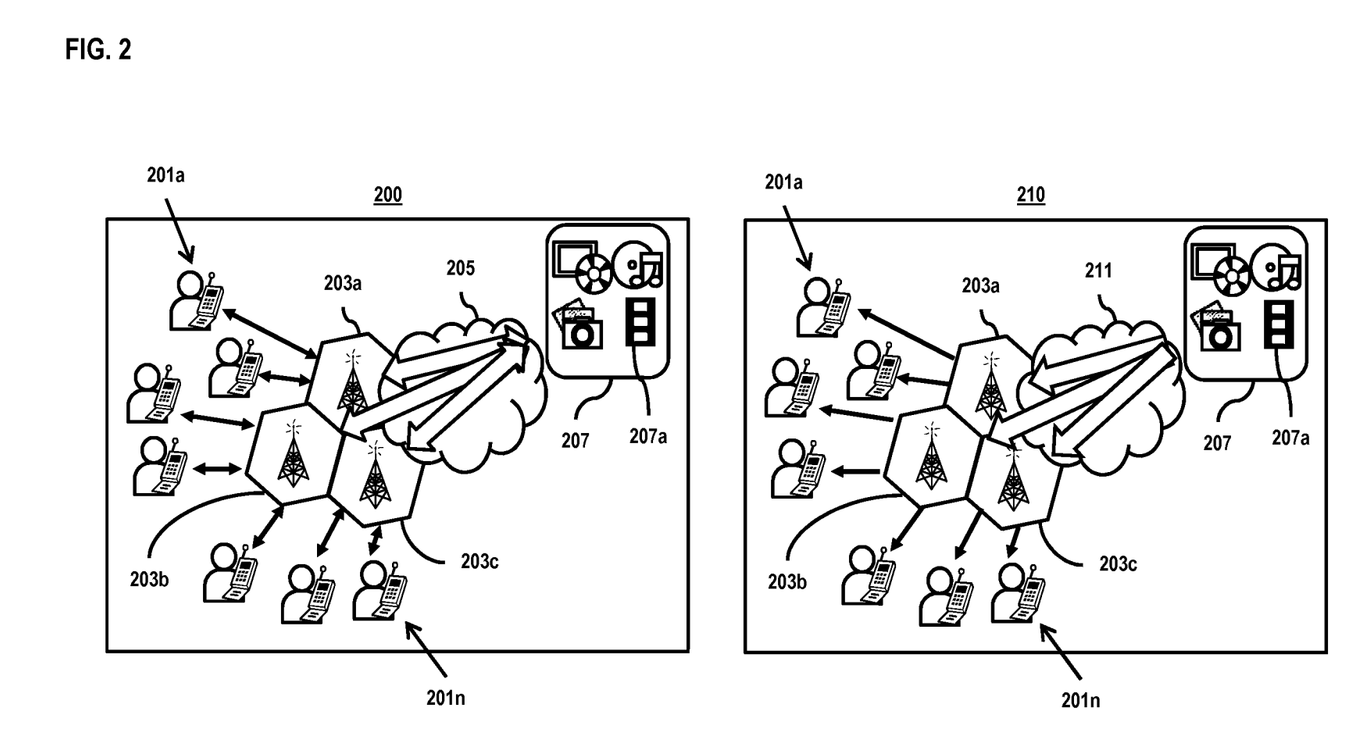
FIG. 2 is an illustration of different scenarios for delivering contents to a plurality of users, according to various examples.

FIG. 2 includes an illustration of different scenarios for delivering contents to a plurality of users. In one example, diagram 200 includes a plurality of users/devices 201a-201n that may communicate with a respective communication node, e.g., a communication cell, 203a, 203b, and 203c, in order to connect to one or more service/content providers 205 for requesting and receiving one or more content items 207. In the example of the diagram 200, content items 207 are delivered to the users 201 via a unicast transmission mechanism 205, wherein each user device may receive a copy of a content item 207, wherein the multiple unicast transmissions will create a network load equivalent to the sum of the transmissions of the copies of content items delivered to the users. For example, if a copy of a content item 207a is delivered to seven users at 1 Mbps each, then the total network load would be 7 Mbps, which would not be a very efficient use of the network resources for delivering the same content item 207a to the plurality of users. However, in the example of diagram 210, the same copy of the content item 207a is delivered via a broadcast transmission mechanism 211, which would instead cause a network load of only 1 Mbps since only one copy of the content item 207a at 1 Mbps is transmitted to all of the users. As noted earlier, an eMBMS is a point-to-multipoint service in which data is transmitted from a single source entity to multiple recipients where transmitting the same data to multiple recipients allows network resources to be shared.

Figure 3:
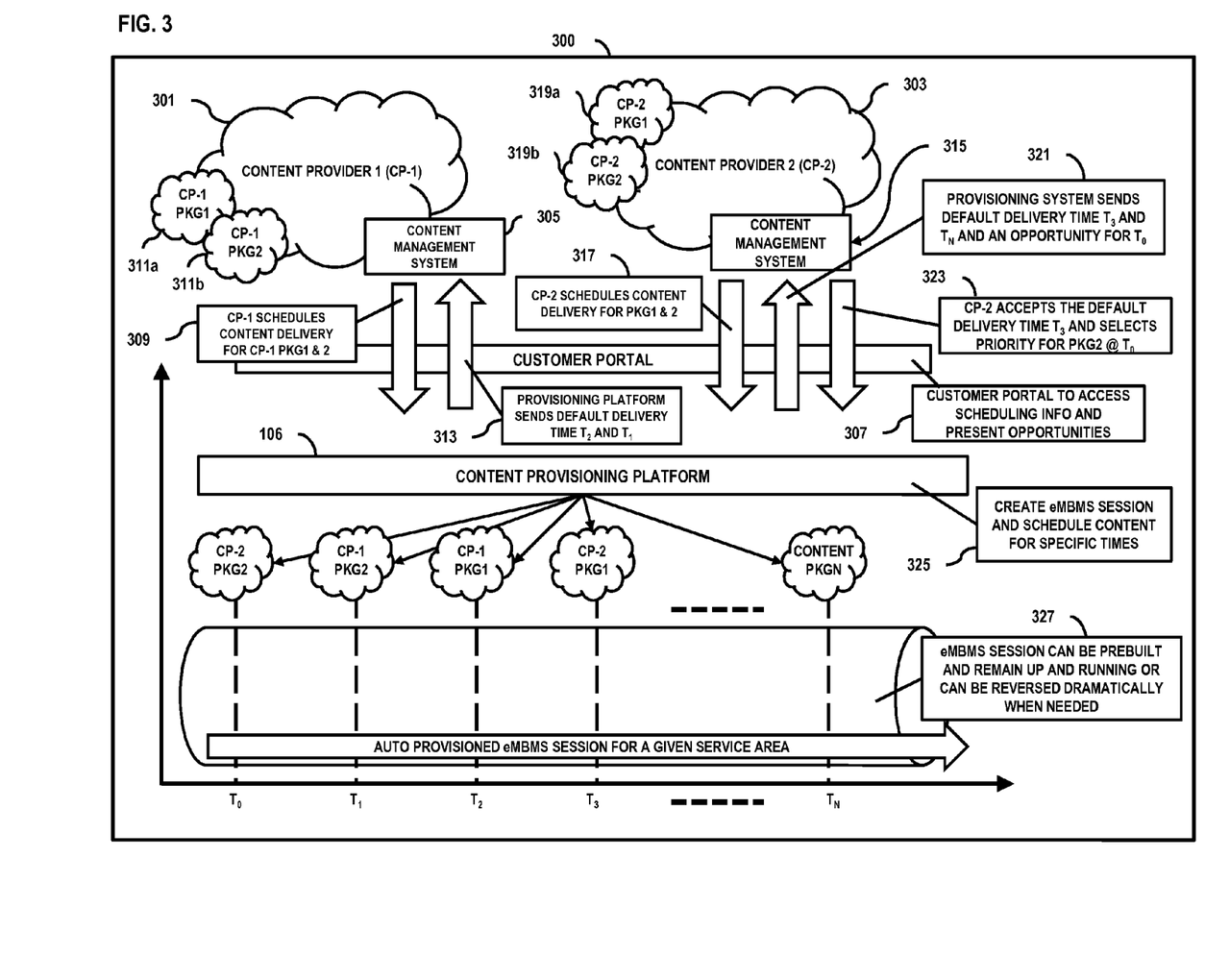
FIG. 3 includes a diagram of a content provisioning system architecture, according to one embodiment.

FIG. 3 includes diagram 300 where a content provisioning platform 106 can schedule and deliver or cause a delivery of contents from one or more sources to one or more service areas according to one or more QoS parameters, according to various embodiments. In one scenario, one or more content providers 301 (CP-1) and 303 (CP-2) may interact with a service provider 115 and request for the service provider to schedule and deliver one or more content items/packages to users in one or more service areas of the service provider. In one example, a content management system 305 may interact with a customer portal 307, which in turn may interact with the content provisioning platform 106. In one embodiment, the content management system 305 may submit CP-1 schedule request 309 for scheduling and delivering of CP-1 content packages PKG1 311a and PKG2 311b, wherein the content provisioning platform 106 may return to the CP-1 content management system 305 schedule and information 313 for the delivery of the PKG1 and PKG2. In this example, the schedule and information 313 includes default delivery times of T(1) for CP-1 PKG2, and T(2) for CP-1 PKG1.

In one embodiment, content management system 315 of CP-2 may submit schedule request 317 for scheduling and delivering of CP-2 content packages CP2-PKG1 319a and CP2-PKG2 319b, wherein the content provisioning platform 106 may return to the CP-2 content management system 315 schedule and information 321 for the delivery of the CP2-PKG1 and CP2-PKG2. In this example, the schedule and information 321 includes default delivery times of T(3) and T(N) for the packages CP2-PKG1 and CP2-PKG2. In one embodiment, the CP-2 may select the time slot for delivery of each content package. In one embodiment, the schedule and information 321 may include one or more options for the CP-2 to modify one or more times of delivery as well as one or more other QoS parameters, for example, a transmission rate via a communication channel. In this example 300, an option to transmit a content package at T(0) is presented so that CP-2 may select one of the content packages for earlier deliver at T(0). In one scenario, the option of T(0) may be presented based on the CP-2 membership status, a content package type, or the like. In one example, the option of T(0) in 321 may be based on additional fees. In one example, CP-2 may accept, in 323, the default delivery time T(3) for delivery of CP2-PKG1 and the priority time slot T(0) for delivery of the CP2-PKG2. In one embodiment, the content provisioning platform 106, at 325, may schedule or facilitate the scheduling of one or more eMBMS multicast channels for the delivery of the content packages from CP-1, CP-2, or other content providers. In one embodiment, an eMBMS session 327 may be prebuilt and remain up and running or can be reversed dramatically when needed. In this example, the content packages are scheduled as CP2-PKG2 at T(0), CP1-PKG2 at T(1), CP1-PKG1 at T(2), CP2-PKG1 at T(3).

In one embodiment, the content provisioning platform 106 may utilize external (e.g., from one or more other service or content providers) as well internal trending data associated with a network service provider to determine usage data for determining content, topics, events, or the like that may be popular and trending among a plurality of users in one or more service areas of the service provider. In one scenario, the external trend data may be provided by a data management/service provider that may use real-time or near real-time data, over a period of time, available from various sources. Additionally, the internal data may categorized by content type, user device type, user information (e.g., male, female, professional, student, etc.) where the categories may be further filtered or combined for generating one or more contextual based data sets. In one embodiment, the content provisioning platform 106 may identify one or more content packages associated with one or more content providers (e.g., CP1-PKG1, CP1-PKG2, CP2-PKG1, CP2-PKG2, etc.) that may be suitable or may be of interest to users for delivering to users in one or more service areas. In addition, the provisioning platform may store or have access to local or remote storage devices for storing various data, configuration parameters, contents, or the like. Further, the content provisioning platform 106 may determine and provide scheduling and QoS parameters/options to the one or more content providers so that they may select from the provided options. For example, the content provisioning platform 106 may determine from the usage data that users may be interested in certain multimedia content, which may available from various content providers. In one embodiment, the content provisioning platform 106 may determine and present a most suitable scheduling and delivery options based on the usage data, available content types, the content providers of the content items/packages, the targeted service area, number of potential users in a service area, targeted user device types in the service area, time/date of targeted delivery, or the like. For instance, the content provisioning platform 106 may determine the types of contents that are to be delivered to the users and if the contents should be preprocessed for a more efficient channel transmission or easier processing/usability at a receiving user device. In one scenario, the content provisioning platform 106 may determine a proper sequence for presenting the contents so that they may add to the users' experience or provide a better value for the content providers associated with the contents.

As noted earlier, a content provisioning platform 106 may be implemented as a stand-alone element in the system 100 and interface with other elements of the system for provisioning the multicast channels and contents. Also, it is possible that the provisioning platform may be implemented as part of a service provider's system or any other component of the system 100.

Figure 4:
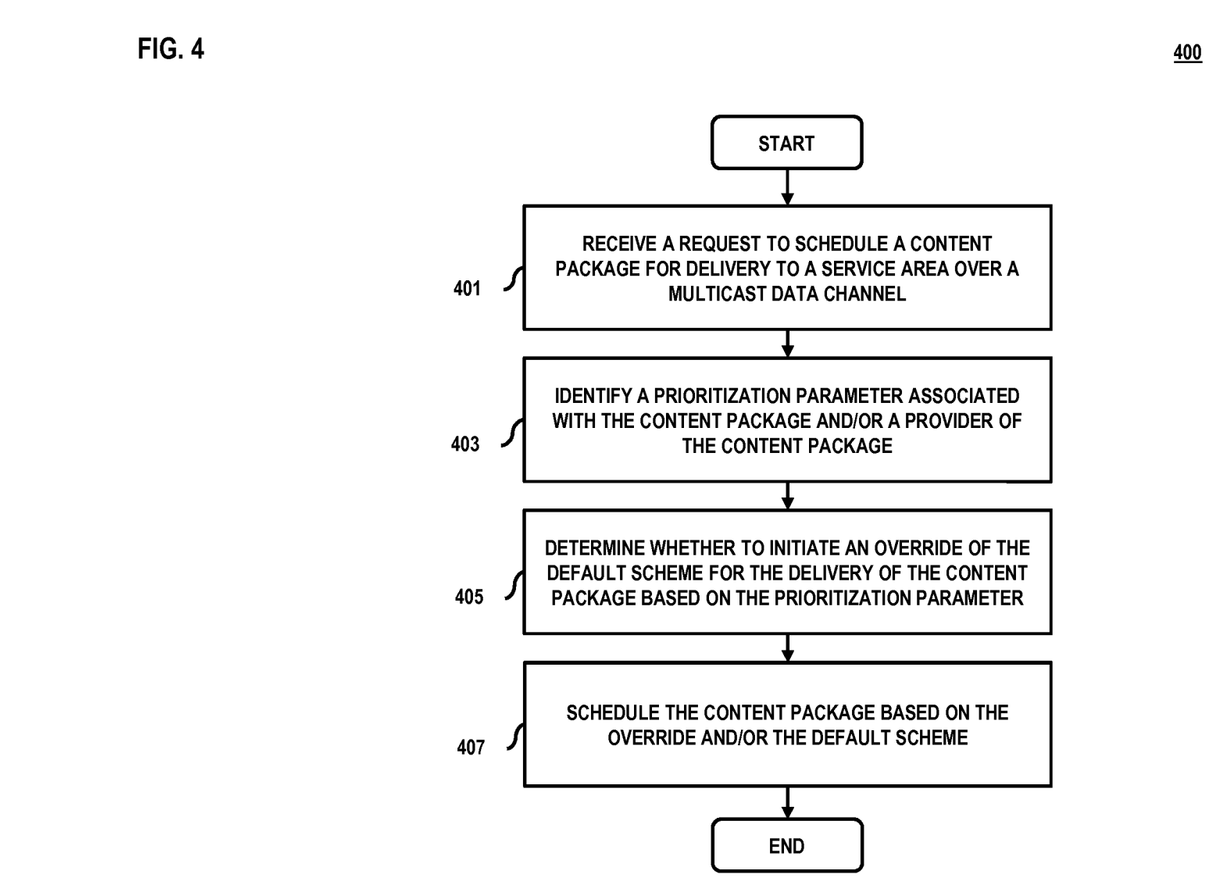
FIGS. 4 through 6 are flowcharts of processes for scheduling and delivery of contents from one or more sources to one or more service areas according to one or more QoS parameters, according to various embodiments.
Figure 5:
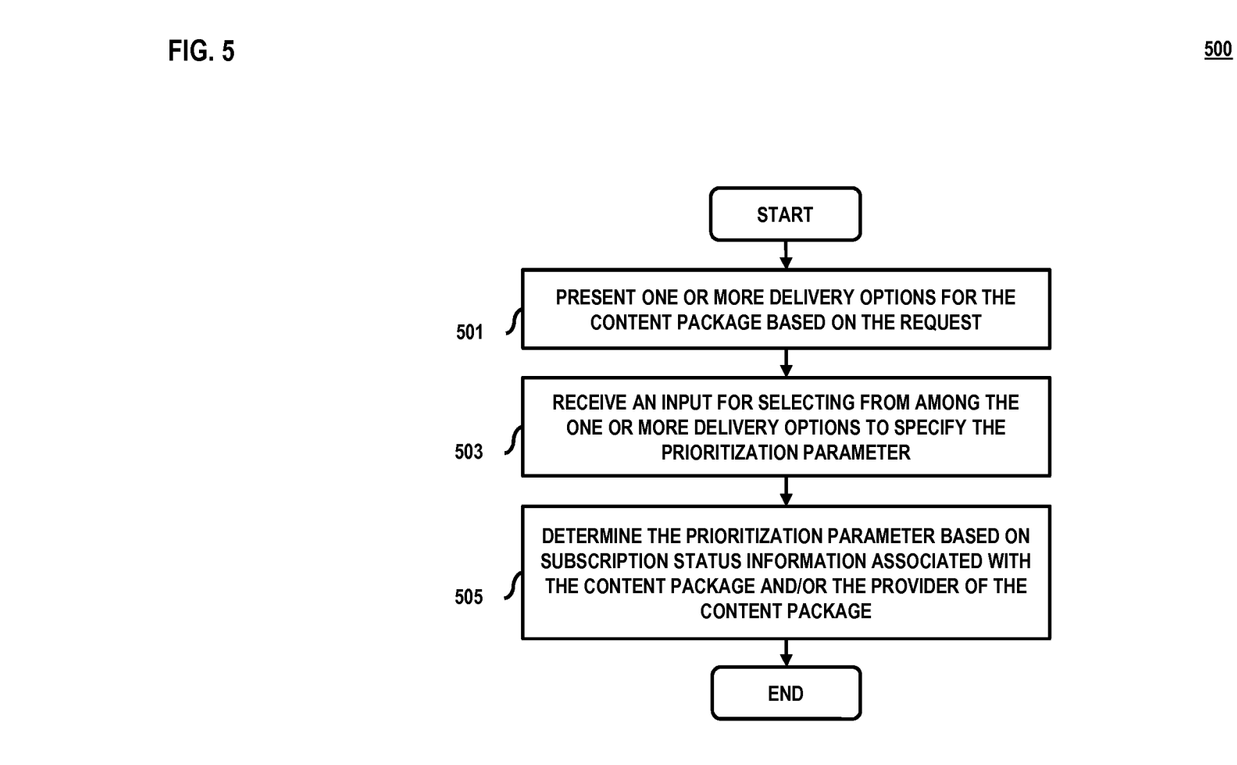
Figure 6:
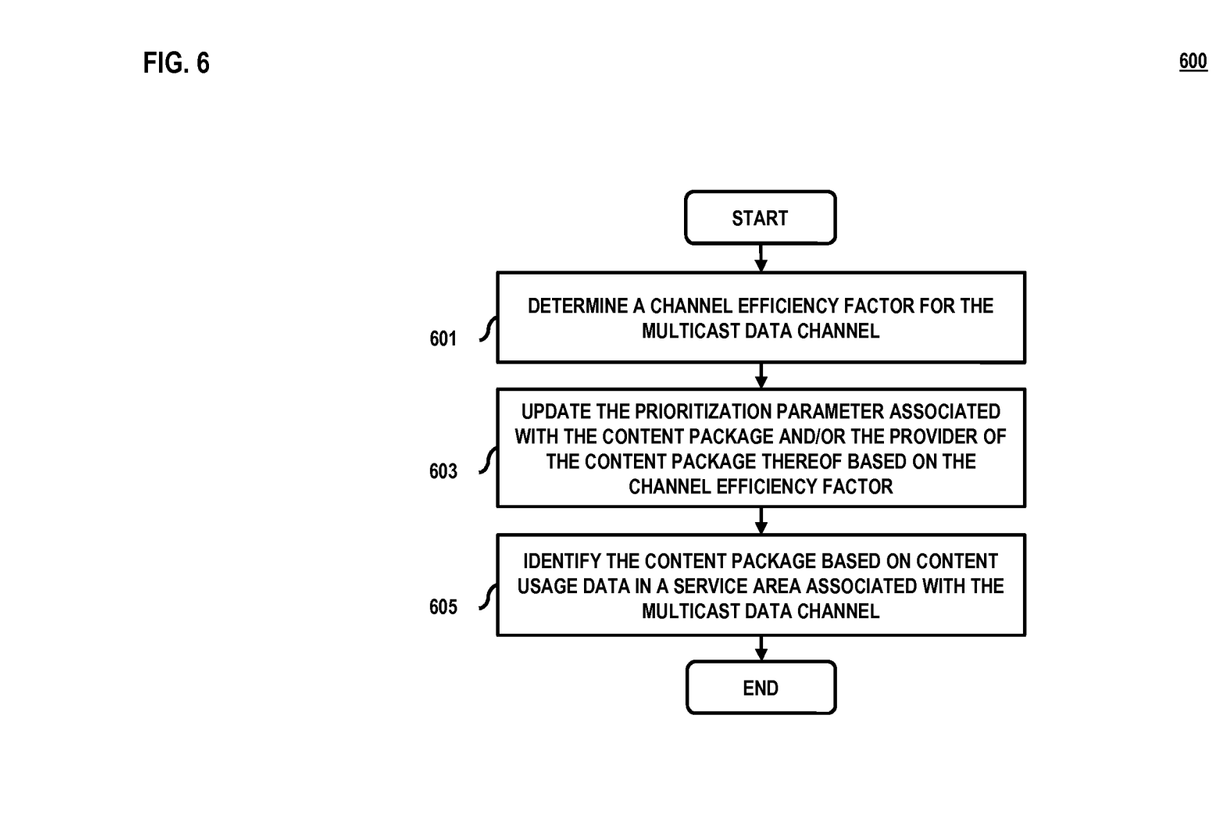

FIGS. 4 through 6 are flowcharts of processes for scheduling and delivery of contents from one or more sources to one or more service areas according to one or more QoS parameters, according to various embodiments. It is noted that the steps of processes 400, 500, and 600 may be performed in any suitable order and by any of the components of the system 100, as well as combined or separated in any suitable manner. Further, for clarity in discussing the processes 400, 500, and 600, the provisioning platform is referred to as completing various steps of said processes; however, said processes and/or example steps described therein may be performed in any suitable order, wherein one or more of the steps may be optional.

As shown in FIG. 4, in step 401 of process 400, a provisioning platform may receive a request to schedule a content package for delivery to a service area over a multicast data channel, wherein the multicast data channel is associated with a default scheme for scheduling the delivery. In one embodiment, a provisioning platform may receive the request from one or more content providers based on information about content usage associated with a service area of a service provider of the provisioning platform. For example, content usage may indicate that certain topics, contents, or events are popular among users of the service area. In one example, the content usage may indicate/predict that the topic, contents, or the events which will become popular in the near future. In one scenario, a content provider may determine the specific content it would like to deliver to the users in one or more service areas based on dynamic provisioning conditions associated with the content usage and the content provider. For example, a content provider may wish to change an advertisement, a discount offer, availability of new content, or the like. In one embodiment, the provisioning platform may utilize or cause the provisioning of one or more dynamic multicast data channels for delivering of the contents to one or more service areas. In one embodiment, a multicast channel may utilize a default scheme for scheduling the delivery of the contents to a service area, wherein the default scheme is based on a first-come first-serve delivery scheme. For example, contents received from a first content provider may be scheduled for transmission via a multicast channel beginning with a first content item at a first available time slot and continue to the subsequent time slots for the remaining content items. In one embodiment, a default scheme may also include one or more QoS parameters associated with a transmission bit rate, confirmation of delivery, confirmation of transmission time slot, or the like.

In one embodiment, the provisioning platform may utilize one or more applications, algorithms, software, or the like to analyze a service provider's network data (e.g., user data). For example, a network operator can access the network data associated with the users of its network for determining content usage, topics of interest, possible events, or the like. In one embodiment, the usage data may include analysis of external public data, which may be available from one or more other service or content providers. For example, the external public data may be provided by a search-engine service provider, a social networking service provider, or the like.

In step 403, the provisioning platform may identify a prioritization parameter associated with the content package, a provider of the content package, or a combination thereof. In various embodiments, the one or more content items or content packages may include one or more parameters for identifying one or more scheduling or QoS parameters for use in delivering the content items/packages to users in one or more service areas. In one embodiment, the prioritization parameters may be associated with a content item/package type; for example, multimedia, text, audio, video, advertisement, coupon, public information, etc. In one embodiment, the prioritization parameters may be associated with a provider of the content item. For example, a content provider may be a local vendor, a national vendor, has special status (e.g., a public entity), or the like. In one embodiment, the prioritization parameter may be associated with an event (e.g., a sporting event, a concert, etc.), which will take place at a predetermined time and location.

In step 405, the provisioning platform may determine whether to initiate an override of the default scheme for the delivery of the content package based on the prioritization parameter. In various embodiments, the override includes (a) a change in a delivery order of the content package with respect to one or more other content packages previously scheduled for the multicast data channel; (b) a specific delivery time for the content package; (c) a specific quality of service level; or (d) a combination thereof. In one scenario, an override option may indicate that a content provider requests a delivery of a content item with respect to (e.g., before or after) one or more other content items, which may have already been scheduled for delivery to a service area, wherein the one or more other content items may be associated with said content provider and/or with one or more other content providers. In one scenario, an override may indicate a specific delivery time for a content item, wherein the delivery time may be an exact time, may be associated with a time period of an event (e.g., beginning, during, end, halftime, etc.), or the like.

In step 407, the provisioning platform may schedule the content package based on the override, the default scheme, or a combination thereof. In one embodiment, the provisioning platform may cause or request for a network service provider (e.g., a cellular network operator) to dynamically configure one or more multicast data channels for provisioning the selected content packages via one or more multicast transmissions to the users in one or more service areas of the service provider. In one embodiment, a multicast data channel is an eMBMS channel. In one embodiment, the provisioning platform may utilize one or more algorithms for scheduling one or more content items of one or more content providers based on an override or a default scheme associated with each of the content items. In one embodiment, a content item may be associated with an override option for one transmission and then with a default scheme in a subsequent transmission.

The process 500 may begin at step 501 of the FIG. 5, where the provisioning platform may present one or more delivery options for the content package based on the request. In one scenario, a provisioning platform may present one or more options to a content provider for scheduling a delivery of content items associated with that content provider. For example, a content provider may be presented with a plurality of transmission time slots in a data channel for the delivery of a plurality of content items of that content provider. In one scenario, the one or more delivery options may include one or more QoS options; for example, a transmission bit rate, a transmission coverage area, a transmission signal to noise ratio of the data channel, or the like. In one embodiment, the one or more delivery options may be determined based on a type of content package, the target service area, the content usage data, or the like. For example, an option for streaming of the coverage of live sporting event may include transmission in high definition for a better user experience.

In step 503, the provisioning platform may receive an input for selecting from among the one or more delivery options to specify the prioritization parameter. In one scenario, a content provider may select one or more of time slots for delivery of its one or more content items. In one scenario, a content provider may choose an optional prioritization parameter for one content item and choose default prioritization parameters for delivery of its remaining content items. In one embodiment, a selection may be based on the type of content, a target service area, possible additional fees for an option, type of possible event associated with the content delivery request, or the like.

In step 505, the provisioning platform may determine the prioritization parameter based on subscription status information associated with the content package, the provider of the content package, or a combination thereof. In one scenario, a content package may be associated with a subscription at a service provider, wherein that content package may be requested to be delivered at a specific time, with respect to one or more other content packages (e.g., before or after), according to a potential fee associated with one or more predefined schedules, or the like. In one scenario, the prioritization parameter may be associated with a content provider of one or more content packages, wherein said content packages are to be delivered according to the prioritization parameter. For example, multimedia content packages of a content provider are to be delivered according to a minimum set of QoS parameters, wherein any delivery options would adhere to the minimum set of QoS parameters.

The process 600 may begin at step 601 of the FIG. 6, where the provisioning platform may determine a channel efficiency factor for the multicast data channel. In one embodiment, the provisioning platform may utilize one or more algorithms for determining the efficiency related to mode, configuration, queuing, compression, modulation, etc. that a service provider may utilize in its network for provisioning one or more data channels for use in the delivery of contents to one or more service areas of the network. For example, the efficiency factor may indicate that transmission of a mix of content items may render a data channel less than optimum, which can affect the delivery and consumption of the content items as well as affect the user experience of users in the target service area.

In step 603, the provisioning platform may update the prioritization parameter associated with the content package, the provider of the content package, or a combination thereof based on the channel efficiency factor. In one embodiment, one or more prioritization parameters associated with one or more content packages may be updated so that the channel efficiency factor may be improved when delivering the one or more content packages. For example, the prioritization parameters for several content packages that can be compressed efficiently may be updated to indicate that they can be transmitted via the same data channel to a targeted service area.

In step 605, the provisioning platform may identify the content package based on content usage data in a service area associated with the multicast data channel. In various scenarios, the provisioning platform may identify one or more content packages based on analysis of internal and external public trending data, and social networking data for determining the content usage data associated with a service area of the provisioning platform. In one scenario, content usage data may include popularity of a topic or certain contents determined from chat data among a group of users, sharing of certain contents among the users, social networking data, number of times a certain term is identified in the usage data, or the like. In one embodiment, the provisioning platform may provide one or more suggestions to one or more content providers as to what type of content packages the content providers should provide for delivery to one or more service areas. In one embodiment, the provisioning platform may monitor the content usage data associated with one or more service areas or communication channels for a duration of time, which may be predefined or may be at different intervals, in order to determine any possible changes in the usage or consumption. In one example, the monitoring may be before or during the provisioning of contents to a service area.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The exemplary techniques and systems presented herein enables scheduling and delivery of contents from one or more sources to one or more service areas according to one or more QoS parameters. As an advantage, a provisioning platform may be utilized to identify content items or packages that may be available from various content providers and determine one or more schedules for the delivery of the contents to one or more service areas via one or more dynamic multicast data channels. Further, the content provisioning platform may determine one or more scheduling and QoS parameters based on selection of one or more options by the content providers. Furthermore, the provisioning platform can select the contents based on a topic, content usage data, or a combination thereof. Additionally, the platform can provision a dynamic multicast data channel for initiating a multicast transmission of the content package to a plurality of devices in the service area.

The processes described herein for scheduling and delivery of contents from one or more sources to one or more service areas according to one or more QoS parameters may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
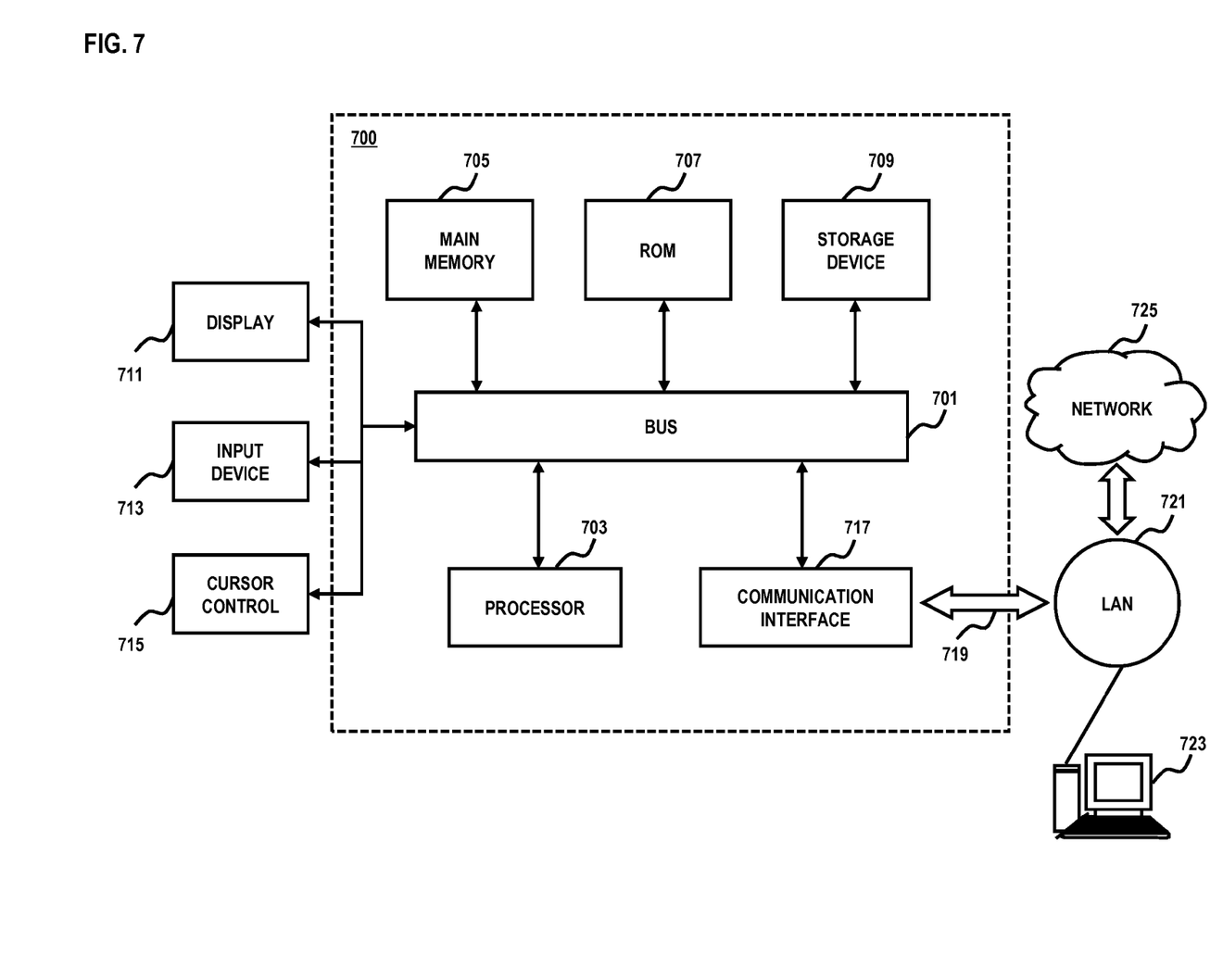
FIG. 7 is a diagram of a computer system that can be used to implement various embodiments.

FIG. 7 illustrates computing hardware (e.g., computer system) upon which an embodiment according to the invention can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
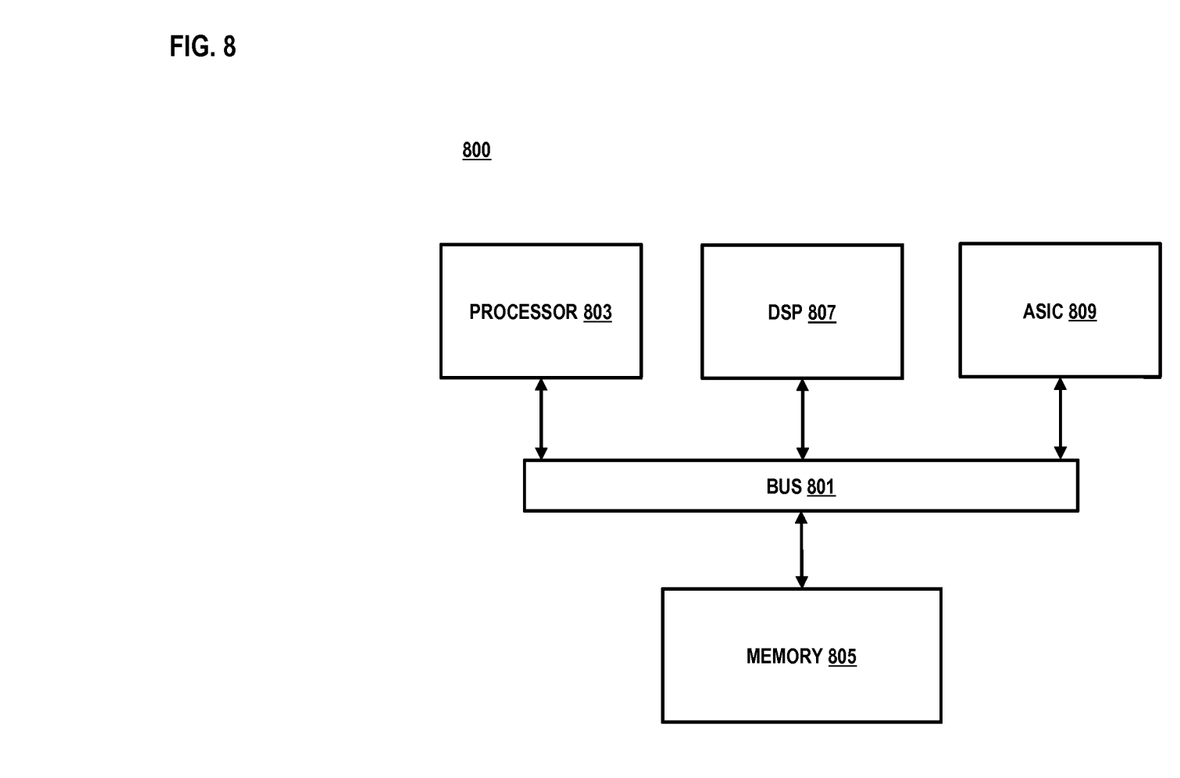
FIG. 8 is a diagram of a chip set that can be used to implement an embodiment of the invention.

FIG. 8 illustrates a chip set 800 upon which an embodiment of the invention may be implemented. Chip set 800 is programmed for scheduling and delivery of contents from one or more sources to one or more service areas according to one or more QoS parameters and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of FIGS. 4-6.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving a request to schedule delivery of a content package to a service area over a multicast data channel, wherein the multicast data channel is associated with a default scheme for scheduling the delivery of the content package;
identifying a prioritization parameter associated with the content package or a provider of the content package;
determining a channel efficiency factor for the multicast data channel, wherein the channel efficiency factor indicates whether transmission of content via the multicast data channel will adversely affect an efficiency of the multicast data channel;
updating the prioritization parameter based on the channel efficiency factor;
determining whether to initiate an override of the default scheme for the delivery of the content package based on the updated prioritization parameter;
scheduling the content package based on the override when it is determined to initiate the override; and
scheduling the content package based on the default scheme when it is determined not to initiate the override.

2. A method of claim 1, wherein the override includes:
a change in a delivery order of the content package with respect to one or more other content packages previously scheduled for the multicast data channel;
a specific delivery time for the content package; or
a specific quality of service level.

3. A method of claim 1, wherein the default scheme is a first-come first-serve delivery scheme.

4. A method of claim 1, further comprising:
presenting one or more delivery options for the content package based on the request; and
receiving an input for selecting from among the one or more delivery options to specify the prioritization parameter.

5. A method of claim 1, further comprising:
determining the prioritization parameter based on subscription status information associated with the content package or the provider of the content package.

6. A method of claim 1, further comprising:
identifying the content package based on content usage data in a service area associated with the multicast data channel.

7. The method of claim 1, wherein determining whether to initiate the override is further based on an input received from the provider of the content package.

8. An apparatus comprising:
a processor; and
a memory including computer program code for one or more programs,
the memory and the computer program code configured to, with the processor, cause the apparatus to:
receive a request to schedule delivery of a content package to a service area over a multicast data channel, wherein the multicast data channel is associated with a default scheme for scheduling the delivery;
identify a prioritization parameter associated with the content package or a provider of the content package;
determine a channel efficiency factor for the multicast data channel, wherein the channel efficiency factor indicates whether transmission of content via the multicast data channel will adversely affect an efficiency of the multicast data channel;
update the prioritization parameter based on the channel efficiency factor;
determine whether to initiate an override of the default scheme for the delivery of the content package based on the updated prioritization parameter;
schedule the content package based on the override when it is determined to initiate the override; and
schedule the content package based on the default scheme when it is determined not to initiate the override.

9. An apparatus of claim 8, wherein the override includes:
a change in a delivery order of the content package with respect to one or more other content packages previously scheduled for the multicast data channel;
a specific delivery time for the content package; or
a specific quality of service level.

10. An apparatus of claim 8, wherein the default scheme is a first-come first-serve delivery scheme.

11. An apparatus of claim 8, wherein the memory, the computer program code and the processor further cause the apparatus to:
present one or more delivery options for the content package based on the request; and
receive an input for selecting from among the one or more delivery options to specify the prioritization parameter.

12. An apparatus of claim 8, wherein the memory, the computer program code and the processor further cause the apparatus to:
determine the prioritization parameter based on subscription status information associated with the content package or the provider of the content package.

13. An apparatus of claim 8, wherein the memory, the computer program code and the processor further cause the apparatus to:
identify the content package based on content usage data in a service area associated with the multicast data channel.

14. The apparatus of claim 8, wherein, when determining whether to initiate the override, the memory, the computer program code and the processor further cause the apparatus to determine whether to initiate the override based on an input received from the provider of the content package.

15. A system comprising:
a content provisioning platform comprising a processor and a memory having instructions stored thereon, the processor configured to:
receive a request to schedule delivery of a content package to a service area over a multicast data channel, wherein the multicast data channel is associated with a default scheme for scheduling the delivery;
identify a prioritization parameter associated with the content package or a provider of the content package;
determine a channel efficiency factor for the multicast data channel, wherein the channel efficiency factor indicates whether transmission of content via the multicast data channel will adversely affect an efficiency of the multicast data channel;
update the prioritization parameter based on the channel efficiency factor;
determine whether to initiate an override of the default scheme for the delivery of the content package based on the updated prioritization parameter;
schedule the content package based on the override when it is determined to initiate the override; and
schedule the content package based on the default scheme when it is determined not to initiate the override.

16. A system of claim 15, wherein the override includes:
a change in a delivery order of the content package with respect to one or more other content packages previously scheduled for the multicast data channel;
a specific delivery time for the content package; or
a specific quality of service level.

17. A system of claim 15, wherein the content provisioning platform is further configured to:
present one or more delivery options for the content package based on the request; and
receive an input for selecting from among the one or more delivery options to specify the prioritization parameter.

18. A system of claim 15, wherein the content provisioning platform is further configured to:
determine the prioritization parameter based on subscription status information associated with the content package or the provider of the content package.

19. A system of claim 15, wherein the content provisioning platform is further configured to:
identify the content package based on content usage data in a service area associated with the multicast data channel.

20. The system of claim 15, wherein, when determining whether to initiate the override, the content provisioning platform is further configured to determine whether to initiate the override based on an input received from the provider of the content package.

* * * * *